US011126378B1

(12) United States Patent
Parker et al.

(10) Patent No.: US 11,126,378 B1
(45) Date of Patent: Sep. 21, 2021

(54) RATE LIMIT ON THE TRANSITIONS OF ZONES TO OPEN

(71) Applicant: Western Digital Technologies, Inc., San Jose, CA (US)

(72) Inventors: Liam Parker, Edinburgh (GB); Daniel L. Helmick, Broomfield, CO (US); Sergey Anatolievich Gorobets, Edinburgh (GB)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/885,073

(22) Filed: May 27, 2020

(51) Int. Cl.
*G06F 3/06* (2006.01)
*G06F 11/10* (2006.01)

(52) U.S. Cl.
CPC .......... *G06F 3/0659* (2013.01); *G06F 3/064* (2013.01); *G06F 3/0619* (2013.01); *G06F 3/0644* (2013.01); *G06F 3/0652* (2013.01); *G06F 3/0653* (2013.01); *G06F 3/0656* (2013.01); *G06F 3/0679* (2013.01); *G06F 11/1068* (2013.01)

(58) Field of Classification Search
CPC ..... G06F 3/0619; G06F 3/0656; G06F 3/0679
See application file for complete search history.

(56) References Cited

U.S. PATENT DOCUMENTS

| 8,046,522 | B2 | 10/2011 | Sinclair et al. | |
|---|---|---|---|---|
| 9,836,232 | B1 | 12/2017 | Vasquez et al. | |
| 2007/0033375 | A1 | 2/2007 | Sinclair et al. | |
| 2010/0174869 | A1 | 7/2010 | Gorobets et al. | |
| 2012/0254174 | A1* | 10/2012 | Mitra | G06F 16/1752 707/737 |
| 2014/0351527 | A1 | 11/2014 | Traut et al. | |
| 2019/0012270 | A1 | 1/2019 | Imazaki et al. | |
| 2019/0266046 | A1 | 8/2019 | Bahirat et al. | |
| 2020/0089407 | A1 | 3/2020 | Baca et al. | |
| 2020/0293401 | A1 | 9/2020 | Lee et al. | |
| 2021/0096945 | A1 | 4/2021 | Kotzur et al. | |
| 2021/0149797 | A1* | 5/2021 | Kanno | G06F 13/4068 |
| 2021/0182202 | A1* | 6/2021 | Jin | G06F 12/0868 |

OTHER PUBLICATIONS

International Search Report and the Written Opinion for International Application No. PCT/US2020/066116 dated Mar. 25, 2021, 15 pages.

* cited by examiner

*Primary Examiner* — Edward J Dudek, Jr.
(74) *Attorney, Agent, or Firm* — Patterson & Sheridan, LLP; Steven H. Versteeg

(57) ABSTRACT

The present disclosure generally relates to methods of operating storage devices. The storage device comprises a controller comprising first random access memory (RAM1), second random access memory (RAM2), and a storage unit divided into a plurality of zones. The controller restricts the host to a maximum number of zones that can be in the open and active state at a time. Open zones can be switched to the closed state, and vice versa, upon a predetermined amount of time expiring. The maximum number of open zones is based on one or more amounts of time to: generate parity data, copy the parity data from the RAM2 to the RAM1, update the parity data, switch a zone from the open and active state to the closed state, and the amount of space in a temporary RAM1 buffer.

20 Claims, 8 Drawing Sheets

FIG. 4

RATE LIMIT ON THE TRANSITIONS OF ZONES TO OPEN

BACKGROUND OF THE DISCLOSURE

Field of the Disclosure

Embodiments of the present disclosure generally relate to storage devices, such as solid state drives (SSDs).

Description of the Related Art

Storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. The data is read and written to one or more erase blocks in the memory device. Each of the erase blocks is associated with a logical block address so that the SSD and/or the host device know the location of where the data is stored. One or more erase blocks may be grouped together by their respective logical block addresses to form a plurality of zones.

As a command is received by the storage device to write data to a particular zone, the data associated with the command is written to the memory device and parity data is simultaneously generated for the data in order to protect the data. The parity data is then stored in volatile memory within the storage device. However, the storage device generally comprises a very limited amount of volatile memory, such as SRAM and DRAM, as volatile memory is expensive. Since multiple zones may be open at the same time, the data being written to the volatile memory takes up a lot of valuable volatile memory space, which may reduce the amount of volatile memory available for other data, or may require a greater amount of volatile memory to be included in the storage device. Moreover, transferring data between the various volatile memories may take a long period of time, causing write delays for the storage device.

Therefore, what is needed is a new method of generating and storing data in a storage device.

SUMMARY OF THE DISCLOSURE

The present disclosure generally relates to methods of operating storage devices. The storage device comprises a controller comprising first random access memory (RAM1), second random access memory (RAM2), and a storage unit divided into a plurality of zones. The controller restricts the host to a maximum number of zones that can be in the open and active state at a time. Open zones can be switched to the closed state, and vice versa, upon a predetermined amount of time expiring. The maximum number of open zones is based on one or more amounts of time to: generate parity data, copy the parity data from the RAM2 to the RAM1 update the parity data, switch a zone from the open and active state to the closed state, and the amount of space in a temporary RAM1 buffer.

In one embodiment, a storage device comprises a non-volatile storage unit, wherein the capacity of the non-volatile storage unit is divided into a plurality of zones. The non-volatile storage unit comprises a plurality of dies and each of the plurality of dies comprising a plurality of erase blocks. The storage device further comprises a first volatile memory unit and a controller coupled to the non-volatile storage unit and the first volatile memory unit. The controller comprises a second volatile memory unit, wherein the controller is configured to set a maximum number of open and active zones and receive one or more first commands to write data to one or more open and active zones of the plurality of zones. The controller is further configured to receive one or more second commands to write data to a first zone, wherein the first zone is in a closed or resource conserved lower performance internal state, change a least recently used open and active zone to the closed or resource conserved lower performance internal state, and change the first zone to open and active state.

In another embodiment, a storage device comprises a non-volatile storage unit, wherein the capacity of the non-volatile storage unit is divided into a plurality of zones. The non-volatile storage unit comprises a plurality of dies and each of the plurality of dies comprising a plurality of erase blocks. The storage device further comprises a first volatile memory unit and a controller coupled to the non-volatile storage unit and the first volatile memory unit. The controller comprises a second volatile memory unit, wherein the controller is configured to set a maximum number of open and active zones, receive one or more commands to write data to one or more open and active zones of the plurality of zones, and generate new first parity data for a first open and active zone in a temporary location of one or more temporary locations in the second volatile memory unit. The controller is further configured to copy previous first parity data for the first open and active zone from the first volatile memory unit to a first location in the second volatile memory unit. The controller is also configured to update the previous first parity data with the new first parity data in the second volatile memory unit, wherein an amount of time the generating the new first parity data, copying the previous first parity data, and updating the previous first parity data takes determines the maximum number of open and active zones.

In another embodiment, a storage device comprises a non-volatile storage unit, wherein the capacity of the non-volatile storage unit is divided into a plurality of zones. The non-volatile storage unit comprises a plurality of dies and each of the plurality of dies comprising a plurality of erase blocks. The storage device further comprises a first volatile memory unit and a controller coupled to the non-volatile storage unit and the first volatile memory unit. The controller comprises a second volatile memory unit, wherein the second volatile memory comprises one or more temporary locations. The controller is configured to set a maximum number of open and active zones, wherein the maximum number of open and active zones is determined based on a number of temporary locations in the second volatile memory and receive one or more first commands to write data to one or more open and active zones of the plurality of zones. The controller is further configured to generate new first parity data for a first open and active in a first temporary location in the second volatile memory unit, change a second open and active zone to a closed or resource conserved lower performance internal state upon receiving one or more second commands to write data to a closed zone, and change the closed zone to an open and active state.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 illustrates a schematic diagram of updating data in flight over time in the storage device, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to methods of operating storage devices. The storage device comprises a controller comprising first random access memory (RAM1), second random access memory (RAM2), and a storage unit divided into a plurality of zones. The controller restricts the host to a maximum number of zones that can be in the open and active state at a time. Open zones can be switched to the closed state, and vice versa, upon a predetermined amount of time expiring. The maximum number of open zones is based on one or more amounts of time to: generate parity data, copy the parity data from the RAM2 to the RAM1, update the parity data, switch a zone from the open and active state to the closed state, and the amount of space in a temporary RAM1 buffer.

Figure 1:
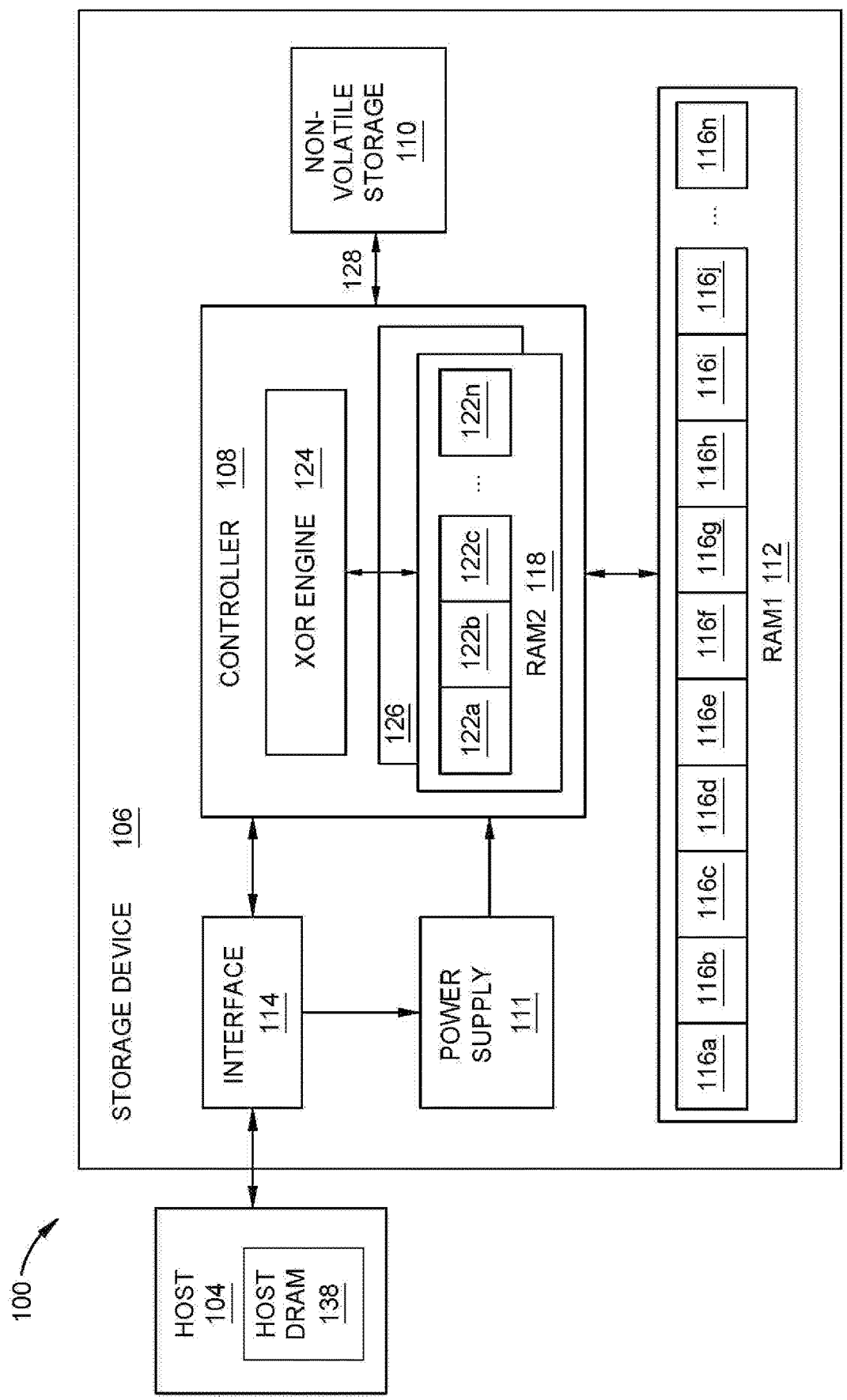
FIG. 1 is a schematic block diagram illustrating a storage system, according to one embodiment.

FIG. 1 is a schematic block diagram illustrating a storage system 100 in which storage device 106 may function as a storage device for a host device 104, in accordance with one or more techniques of this disclosure. For instance, the host device 104 may utilize a storage unit 110, such as non-volatile memory, included in storage device 106 to store and retrieve data. The storage unit 110 may be any type of non-volatile memory, such as MRAM, NAND, NOR, or HDD, for example. In the following descriptions, the storage unit 110 is referenced as a non-volatile memory (NVM) 110 for simplification and exemplary purposes. The host device 104 comprises a host DRAM 138. In some examples, the storage system 100 may include a plurality of storage devices, such as the storage device 106, which may operate as a storage array. For instance, the storage system 100 may include a plurality of storage devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the storage device 106. As illustrated in FIG. 1, the host device 104 may communicate with the storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The storage device 106 includes a controller 108, NVM 110, a power supply 111, a first random-access memory (RAM) or volatile memory 112, such as a dynamic random-access memory (DRAM), and an interface 114. The controller 108 may comprise a parity engine or a XOR engine 124 and a second RAM or volatile memory 118, such as a static random-access memory (SRAM). The XOR engine 124 is a type of parity engine and is called out as a XOR engine for exemplary purposes. However, the XOR engine 124 may include other embodiments that the parity engine comprises. In the following descriptions, a first RAM or volatile memory 112 is referenced to as DRAM and a second RAM or volatile memory 118 is referenced as SRAM for simplification and exemplary purposes. In some examples, the storage device 106 may include additional components not shown in FIG. 1 for sake of clarity. For example, the storage device 106 may include a printed circuit board (PCB) to which components of the storage device 106 are mechanically attached and which includes electrically conductive traces that electrically interconnect components of the storage device 106, or the like. In some examples, the physical dimensions and connector configurations of the storage device 106 may conform to one or more standard form factors. Some example standard form factors include, but are not limited to, 2.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the storage device 106 may be directly coupled (e.g., directly soldered) to a motherboard of the host device 104.

The interface 114 of the storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, PCIe, non-volatile memory express (NVMe), OpenCAPI, GenZ, Cache Coherent Interface Accelerator (CCIX), Compute Express Link (CXL), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the storage device 106 to receive power from the host device 104. For example, as illustrated in FIG. 1, the power supply 111 may receive power from the host device 104 via the interface 114.

The storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

A portion of the NVM 110 may be formatted into logical blocks such that a capacity of the NVM 110 is divided into a plurality of zones. Each of the zones comprise a plurality of physical or erase blocks of the NVM 110, and each of the erase blocks are associated a plurality of logical blocks. Each of the logical blocks is associated with a unique LBA or sector. Each of the zones may have a size aligned to the capacity of one or more erase blocks of the NVM 110. When the controller 108 receives a command, such as from a host device 104, the controller 108 can read data from and write data to the plurality of logical blocks associated with the plurality of erase blocks of the NVM 110.

The storage device 106 includes a power supply 111, which may provide power to one or more components of the storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, RAM, DRAM, SRAM, and synchronous dynamic RAM (SDRAM (e.g., DDR1, DDR2, DDR3, DDR3L, LPDDR3, DDR4, LPDDR4, DDR5, LPDDR5, and the like)). As illustrated in FIG. 1, volatile memory may consume power received from the power supply 111.

The various types of volatile memories may be used with different access properties. For example, DRAM 112 may be arranged for longer burst accesses to allow for improved bandwidth (BW) of the same access bus. Alternatively, DRAM 112 may be used with smaller accesses such that random small accesses may have better latency. The controller 108 comprises additional optional SRAM and/or embedded MRAM 126. Embedded MRAM 126 is another alternative memory that may be used in another embodiment. Similarly, the access to the MRAM 126 can be optimized for different design purposes, but the quantity of embedded MRAM 126 in the SSD controller 108 may be cost sensitive. Therefore, the choice of how much data and which data goes into the premium non-volatile memory and premium volatile memory will subject to system tradeoffs.

The storage device 106 includes a controller 108, which may manage one or more operations of the storage device 106. For instance, the controller 108 may manage the reading of data from and/or the writing of data to the NVM 110 via a toggle mode (TM) bus 128. In some embodiments, when the storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the storage device 106 receives a write command from the host device 104, the controller 108 temporarily stores the data associated with the write command in the internal memory or buffer (not shown) before sending the data to the NVM 110.

The controller 108 may include a XOR engine 124 with logic and/or features to generate XOR parity information. Exclusive OR (XOR) parity information may be used to improve reliability of storage device 106, such as enabling data recovery of failed writes or failed reads of data to and from NVM or enabling data recovery in case of power loss. The reliability may be provided by using XOR parity information generated or computed based on data stored to storage device 106. Data may pass through the XOR engine 124 to be written to the NVM 110. The XOR engine 124 may generate a parity stream to be written to the SRAM 118. The SRAM 118 and the DRAM 112 may each contain a plurality of regions which data may be written to. Data associated with a zone may be copied from an SRAM region 122a-122n in the SRAM 118 to a DRAM region 116a-116n in the DRAM 112, and vice-versa.

The SRAM 118 and the DRAM 112 each individually comprises one or more dies. Each of the one or more dies comprises one or more ranks which is comprised of one or more banks. The banks are composed of rows and pages. The SRAM 118 in the controller 108 may be logically or physical separated into different SRAM areas or regions 122a-122n for use by the controller 108. Similarly, the DRAM 112 may be logically or physical separated into different DRAM areas or regions 116a-116n for use by the controller 108. The MRAM inside of the controller 108 may be logically or physical separated into different MRAM areas or regions (not shown). External attachments of MRAM often have a vendor specific structure and access not covered here.

Figure 2A:
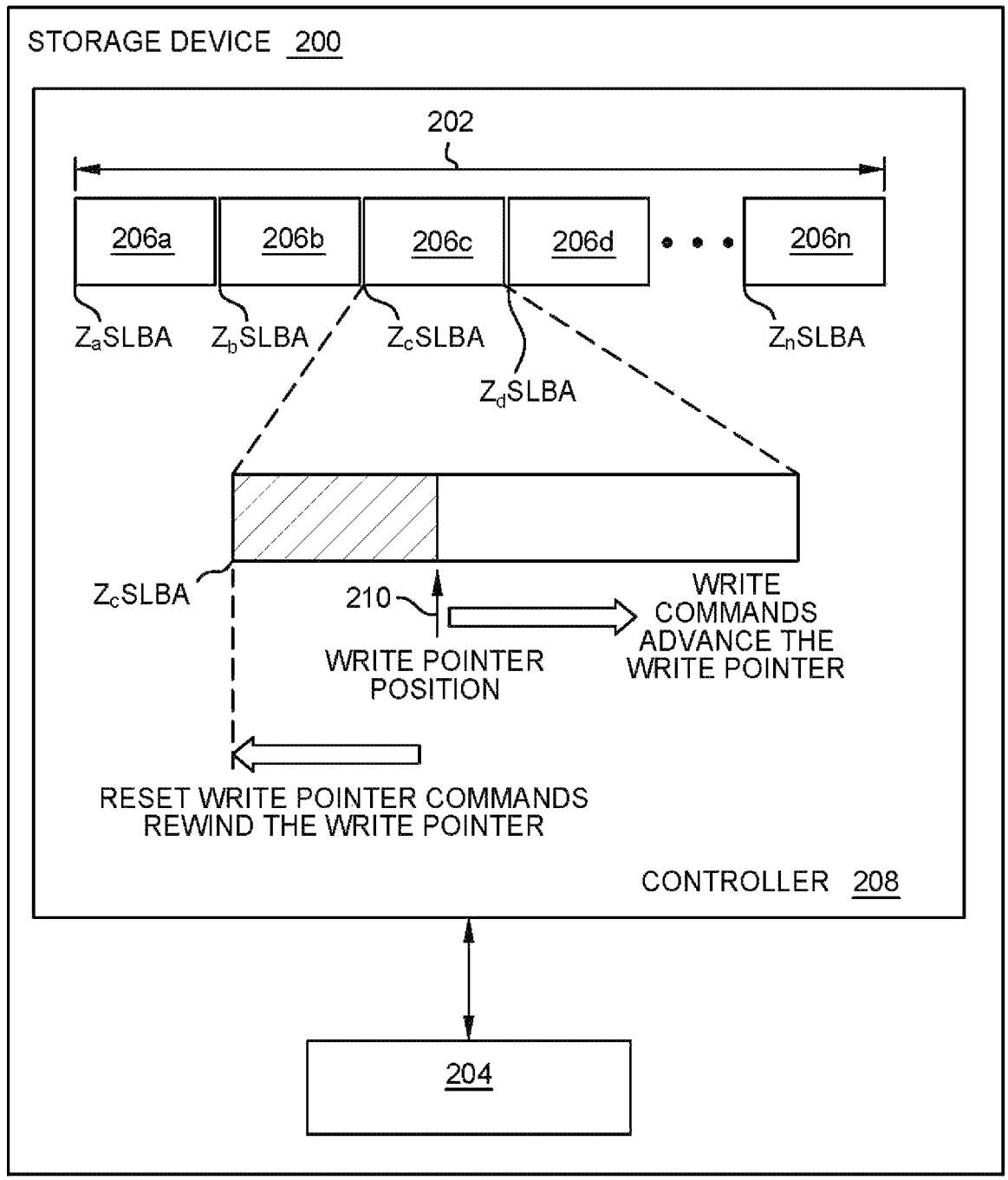
FIG. 2A illustrates a zoned namespace utilized in a storage device, according to one embodiment.
Figure 2B:
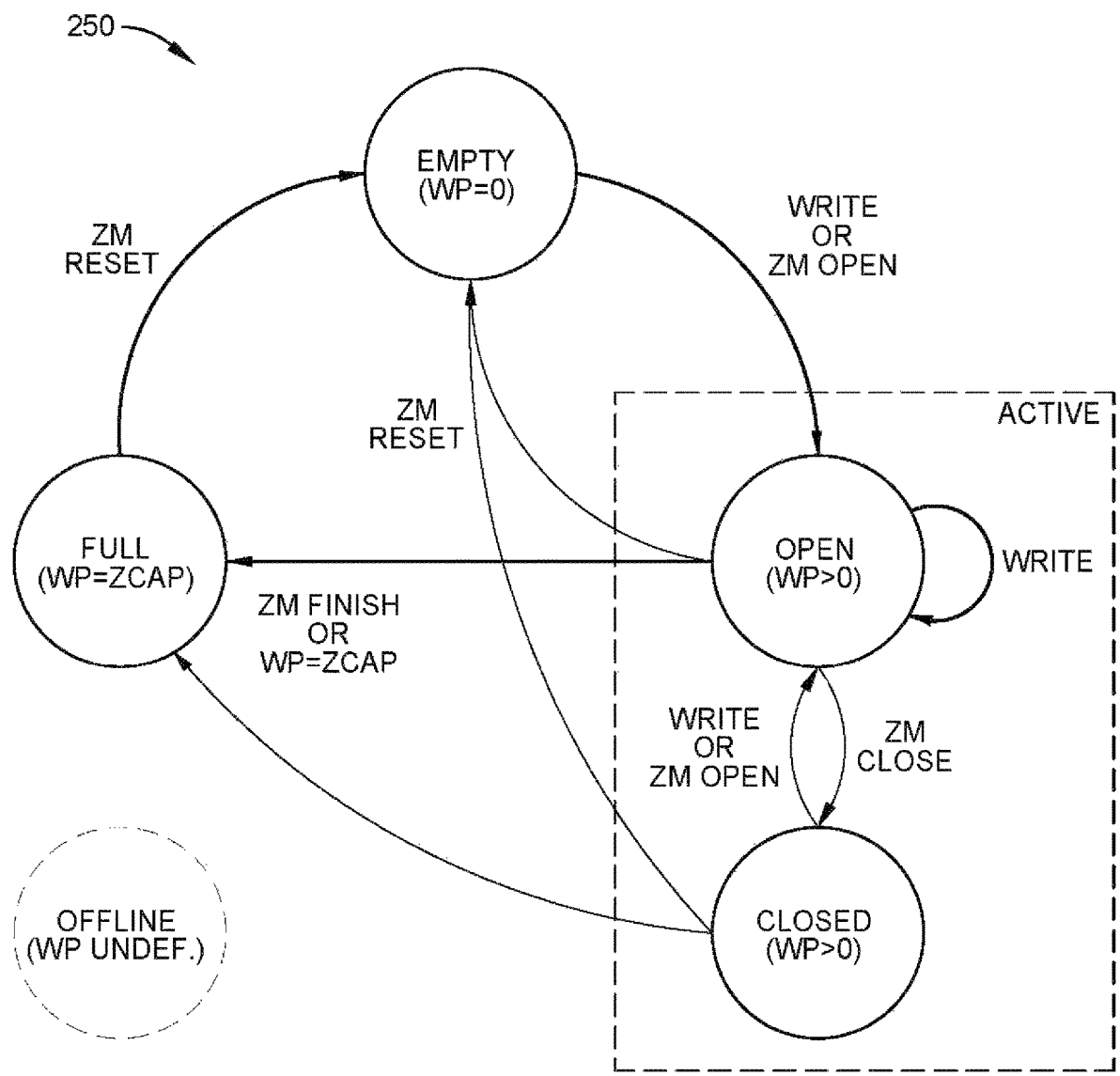
FIG. 2B illustrates a state diagram for the zoned namespaces of the storage device of FIG. 2A, according to one embodiment.

FIG. 2A illustrates a Zoned Namespaces (ZNS) 202 view utilized in a storage device 200, according to one embodiment. The storage device 200 may present the ZNS 202 view to a host device. FIG. 2B illustrates a state diagram 250 for the ZNS 202 of the storage device 200, according to one embodiment. The storage device 200 may be the storage device 106 of the storage system 100 of FIG. 1. The storage device 200 may have one or more ZNS 202, and each ZNS 202 may be different sizes. The storage device 200 may further comprise one or more conventional namespaces in addition to the one or more Zoned Namespaces 202. Moreover, the ZNS 202 may be a zoned block command (ZBC) for SAS and/or a zoned-device ATA command set (ZAC) for SATA. Host side zone activity may be more directly related to media activity in zoned drives due to the relationship of logical to physical activity possible.

In the storage device 200, the ZNS 202 is the quantity of NVM that can be formatted into logical blocks such that the capacity is divided into a plurality of zones 206a-206n (collectively referred to as zones 206). The NVM may be the storage unit or NVM 110 of FIG. 1. Each of the zones 206 comprise a plurality of physical or erase blocks (not shown) of a memory unit or NVM 204, and each of the erase blocks are associated a plurality of logical blocks (not shown). Each of the zones 206 may have a size aligned to the capacity of one or more erase blocks of a NVM or NAND device. When the controller 208 receives a command, such as from a host device (not shown) or the submission queue of a host device, the controller 208 can read data from and write data to the plurality of logical blocks associated with the plurality of erase blocks (EBs) of the ZNS 202. Each of the logical blocks is associated with a unique LBA or sector.

In one embodiment, the NVM 204 is a NAND device. The NAND device comprises one or more dies. Each of the one or more dies comprises one or more planes. Each of the one or more planes comprises one or more erase blocks. Each of the one or more erase blocks comprises one or more wordlines (e.g., 256 wordlines). Each of the one or more wordlines may be addressed in one or more pages. For example, an MLC NAND die may use upper page and lower page to reach the two bits in each cell of the full wordline (e.g., 16 KiB per page). Furthermore, each page can be accessed at a granularity equal to or smaller than the full page. A controller can frequently access NAND in user data granularity logical block address (LBA) sizes of 512 bytes. Thus, as referred to in the below description, NAND locations are equal to a granularity of 512 bytes. As such, an LBA size of 512 bytes and a page size of 16 KiB for two pages of an MLC NAND results in 32 LBAs per wordline. However, the NAND location size is not intended to be limiting, and is merely used as an example.

When data is written to an erase block, one or more logical blocks are correspondingly updated within a zone 206 to track where the data is located within the NVM 204. Data may be written to one zone 206 at a time until a zone 206 is full, or to multiple zones 206 such that multiple zones 206 may be partially full. Similarly, when writing data to a particular zone 206, data may be written to the plurality of erase blocks one block at a time, in sequential order of NAND locations, page-by-page, or wordline-by-wordline, until moving to an adjacent block (i.e., write to a first erase block until the first erase block is full before moving to the second erase block), or to multiple blocks at once, in sequential order of NAND locations, page-by-page, or wordline-by-wordline, to partially fill each block in a parallel fashion (i.e., writing the first NAND location or page of each erase block before writing to the second NAND location or page of each erase block). This sequential programming of every NAND location is a typical non-limiting requirement of many NAND EBs.

When a controller 208 selects the erase blocks that will store the data for each zone, the controller 208 will be able to choose the erase blocks either at the zone open time, or it may choose the erase blocks as it reaches a need to fill the first wordline of that particular erase block. This may be more differentiating when the above described method of filling one erase block completely prior to starting the next erase block is utilized. The controller 208 may use the time difference to select a more optimal erase block in a just-in-time basis. The decision of which erase block is allocated and assigned for each zone and its contiguous LBAs can be occurring for zero or more concurrent zones at all times within the controller 208.

Each of the zones 206 is associated with a zone starting logical block address (ZSLBA) or zone starting sector. The ZSLBA is the first available LBA in the zone 206. For example, the first zone 206a is associated with $Z_a$SLBA, the second zone 206b is associated with $Z_b$SLBA, the third zone 206c is associated with $Z_c$SLBA, the fourth zone 206d is associated with $Z_d$SLBA, and the $n^{th}$ zone 206n (i.e., the last zone) is associated with $Z_n$SLBA. Each zone 206 is identified by its ZSLBA, and is configured to receive sequential writes (i.e., writing data to the NVM 110 in the order the write commands are received).

As data is written to a zone 206, a write pointer 210 is advanced or updated to point to or to indicate the next available block in the zone 206 to write data to in order to track the next write starting point (i.e., the completion point of the prior write equals the starting point of a subsequent write). Thus, the write pointer 210 indicates where the subsequent write to the zone 206 will begin. Subsequent write commands are 'zone append' commands, where the data associated with the subsequent write command appends to the zone 206 at the location the write pointer 210 is indicating as the next starting point. An ordered list of LBAs within the zone 206 may be stored for write ordering. Each zone 206 may have its own write pointer 210. Thus, when a write command is received, a zone is identified by its ZSLBA, and the write pointer 210 determines where the write of the data begins within the identified zone.

FIG. 2B illustrates a state diagram 250 for the ZNS 202 of FIG. 2A. In the state diagram 250, each zone may be in a different state, such as empty, active, full, or offline. When a zone is empty, the zone is free of data (i.e., none of the erase blocks in the zone are currently storing data) and the write pointer is at the ZSLBA (i.e., WP=0). An empty zone switches to an open and active zone once a write is scheduled to the zone or if the zone open command is issued by the host. Zone management (ZM) commands can be used to move a zone between zone open and zone closed states, which are both active states. If a zone is active, the zone comprises open blocks that may be written to, and the host may be provided a description of recommended time in the active state. The controller 208 comprises the ZM. Zone metadata may be stored in the ZM and/or the controller 208.

The term "written to" includes programming user data on 0 or more NAND locations in an erase block and/or partially filled NAND locations in an erase block when user data has not filled all of the available NAND locations. The term "written to" may further include moving a zone to full due to internal drive handling needs (open block data retention concerns because the bits in error accumulate more quickly on open erase blocks), the storage device 200 closing or filling a zone due to resource constraints, like too many open zones to track or discovered defect state, among others, or a host device closing the zone for concerns such as there being no more data to send the drive, computer shutdown, error handling on the host, limited host resources for tracking, among others.

The active zones may be either open or closed. An open zone is an empty or partially full zone that is ready to be written to and has resources currently allocated. The data received from the host device with a write command or zone append command may be programmed to an open erase block that is not currently filled with prior data. A closed zone is an empty or partially full zone that is not currently receiving writes from the host in an ongoing basis. The closed state of a zone is a resource conserved lower performance internal state. The movement of a zone from an open state to a closed state allows the controller 308 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>0). Active zones may switch between the open and closed states per designation by the ZM, or if a write is scheduled to the zone. Additionally, the ZM may reset an active zone to clear or erase the data stored in the zone such that the zone switches back to an empty zone. Once an active zone is full, the zone switches to the full state. A full zone is one that is completely filled with data, and has no more available sectors or LBAs to write data to (i.e., WP=zone capacity (ZCAP)). In a full zone, the write pointer points to the end of the writeable capacity of the zone. Read commands of data stored in full zones may still be executed.

The zones may have any total capacity, such as 256 MiB or 512 MiB. However, a small portion of each zone may be inaccessible to write data to, but may still be read, such as a portion of each zone storing the parity data and one or more excluded erase blocks. For example, if the total capacity of a zone 206 is 512 MiB, the ZCAP may be 470 MiB, which is the capacity available to write data to, while 42 MiB are unavailable to write data. The writeable capacity (ZCAP) of a zone is equal to or less than the total zone storage capacity. The storage device 200 may determine the ZCAP of each zone upon zone reset. For example, the controller 208 or the ZM may determine the ZCAP of each zone. The storage device 200 may determine the ZCAP of a zone when the zone is reset.

The ZM may reset a full zone, scheduling an erasure of the data stored in the zone such that the zone switches back to an empty zone. When a full zone is reset, the zone may not be immediately cleared of data, though the zone may be marked as an empty zone ready to be written to. However, the reset zone must be erased prior to switching to an open and active zone. A zone may be erased any time between a ZM reset and a ZM open. Upon resetting a zone, the storage device 200 may determine a new ZCAP of the reset zone and update the Writeable ZCAP attribute in the zone metadata. An offline zone is a zone that is unavailable to write data to. An offline zone may be in the full state, the empty state, or in a partially full state without being active.

Since resetting a zone clears or schedules an erasure of all data stored in the zone, the need for garbage collection of individual erase blocks is eliminated, improving the overall garbage collection process of the storage device 200. The storage device 200 may mark one or more erase blocks for erasure. When a new zone is going to be formed and the storage device 200 anticipates a ZM open, the one or more erase blocks marked for erasure may then be erased. The storage device 200 may further decide and create the physical backing of the zone upon erase of the erase blocks. Thus, once the new zone is opened and erase blocks are being selected to form the zone, the erase blocks will have been erased. Moreover, each time a zone is reset, a new order for the LBAs and the write pointer 210 for the zone 206 may be selected, enabling the zone 206 to be tolerant to receive commands out of sequential order. The write pointer 210 may optionally be turned off such that a command may be written to whatever starting LBA is indicated for the command.

Referring back to FIG. 2A, when the host sends a write command to write data to a zone 206, the controller 208 pulls-in the write command and identifies the write command as a write to a newly opened zone 206. The controller 208 selects a set of EBs to store the data associated with the write commands of the newly opened zone 206 to, and the newly opened zone 206 switches to an active zone 206. The write command may be a command to write new data, or a command to move valid data to another zone for garbage collection purposes. The controller 208 is configured to DMA read new commands from a submission queue populated by a host device.

In an empty zone 206 just switched to an active zone 206, the data is assigned to the zone 206 and the associated set of sequential LBAs of the zone 206 starting at the ZSLBA, as the write pointer 210 is indicating the logical block associated with the ZSLBA as the first available logical block. The data may be written to one or more erase blocks or NAND locations that have been allocated for the physical location of the zone 206. After the data associated with the write command has been written to the zone 206, a write pointer 210 is updated to point to the next LBA available for a host write (i.e., the completion point of the first write). The write data from this host write command is programmed sequentially into the next available NAND location in the erase block selected for physical backing of the zone.

For example, the controller 208 may receive a first write command to a third zone 206c, or a first zone append command. The host identifies sequentially which logical block of the zone 206 to write the data associated with the first command to. The data associated with the first command is then written to the first or next available LBA(s) in the third zone 206c as indicated by the write pointer 210, and the write pointer 210 is advanced or updated to point to the next available LBA available for a host write (i.e., WP>0). If the controller 208 receives a second write command to the third zone 206c, or a second zone append command, the data associated with the second write command is written to the next available LBA(s) in the third zone 206c identified by the write pointer 210. Once the data associated with the second command is written to the third zone 206c, the write pointer 210 once again advances or updates to point to the next available LBA available for a host write. Resetting the third zone 206c moves the write pointer 210 back to the $Z_c$SLBA (i.e., WP=0), and the third zone 206c switches to an empty zone.

FIGS. 3A-3D illustrate a schematic block diagram of generating and/or updating data corresponding to various zones in the volatile memory, according to various embodiments. Aspects of the system 100 of FIG. 1 will be used in accordance with FIG. 3A-3D. In the following descriptions, a non-volatile storage unit 110 is referred to as a NVM, a first RAM or volatile memory 112 (i.e., a first RAM1) is referred to as DRAM, and a second RAM or volatile memory 118 (i.e., a second RAM2) is referred to as SRAM for simplification and exemplary purposes.

The data storage device 300 may be the storage device 106 described in FIG. 1 of the storage device 200 of FIG. 2A, and the non-volatile memory (NVM) 306 may be the non-volatile memory 110 described in system 100 of FIG. 1. Terminology such as NAND may be utilized throughout to describe the non-volatile memory 110. Such terminology is not meant to be limiting, but to provide an example of a possible embodiment of the reference. The controller 302 may be the controller 108 described in system 100 of FIG. 1, the XOR engine 304 may be the XOR engine 124 described in system 100 of FIG. 1, the SRAM 308 may be the SRAM 118 described in system 100 of FIG. 1, and the DRAM 312 may be the DRAM 112 of FIG. 1.

The phrase "parity data" is utilized throughout as an example of data in flight, and is not intended to be limiting, as other forms of data in flight may be relevant. In other words, the parity data discussed in the examples below is data in flight and may include unwritten host data. Unwritten user or host data may comprise small lengths or amount of data (e.g., less than the size of one or more wordlines) that are stored in a parking location or buffer, such as the SRAM region 310m, until the aggregated size of the data reaches a minimum size (e.g., the size of one or more wordlines), in which case the unwritten user data is written to the NVM 110.

The parity data, deemed as data in flight, is considered the parity buffer and may protect the loss of data due to data corruption, erroneous bit transfer, power loss, and other causes of data loss. The parity data may be generated or updated in the SRAM, and temporarily stored in the SRAM 308 and/or DRAM 312 before being copied to the NVM 306, for example. Furthermore, in case of power failure, capacitors (not shown) located within the storage device, such as the storage device 300 of FIG. 1, may store an adequate amount of energy to program data from the DRAM 312 to the NVM 306 to help prevent data loss, for example.

In FIGS. 3A-3D, zones are denoted by "Wxx" where "x" represents a zone ID. The use of "Wxx" to define a zone ID in a SRAM region 310a-310n signifies that a controller 302 has received a write command to write data to a zone and will update parity data for the corresponding zone. However, the use of "Wxx" to define a zone ID in a DRAM region 314a-314n signifies that the parity data has been successfully updated in a SRAM region 310a-310n and written from the relevant SRAM region 310a-310n to a DRAM region 314a-314n. A SRAM region 310a-310n and a DRAM region 314a-314n may by any suitable size related to a zone, as described above.

Furthermore, in the embodiments discussed below, the SRAM 308 may comprise some amount of space dedicated as a temporary buffer or "scratch pad" for the parity data of a zone associated with a write command. The temporary buffer may comprise about one SRAM region 310n to about five SRAM regions 310n-4-310n, or more than five SRAM regions 310n-4-310n in some embodiments. Data stored in a temporary SRAM region 310n-4-310n may be stored for short periods of time. The SRAM 308 further comprises a plurality of non-temporary SRAM regions 310a-310f where data may be stored for long periods of time. The listed number of SRAM regions 310a-310n, both temporary and non-temporary, is not intended to be limiting, but to provide examples of possible embodiments.

Parity data for zones may be further denoted by an asterisk (*) or a single quotation or prime park ('). An asterisk (*) signifies that the new parity data for a zone has been programmed from the XOR engine 304 to the temporary buffer in the SRAM 118, but has not yet updated a SRAM region 310a-310n storing related parity data for the zone copied from a DRAM region 314a-314n. A single quotation or prime mark (') refers to a zone comprising an updated parity data associated with a write command to the temporary buffer of the SRAM 308.

The data storage device 300 may restrict or limit the host, such as the host device 104 of FIG. 1, to a maximum number of concurrent zones in the open and active state. For example, the maximum number of zones in the open active state may be restricted to about 128 zones to about 1024 zones. An active zone refers to a zone that is available for data to be written to or copied from as discussed in the FIG. 2B. An open state describes a zone that is receiving write commands, whereas a closed state or a resource conserved lower performance internal state describes a zone that is not currently receiving write commands. The closed state of a zone is a resource conserved lower performance internal state.

After a predetermined amount of time has expired since last switching the state of a zone, such as about 0.5 seconds to about 1 second, 1 second to about 5 seconds, or about 0.5 seconds to about 5 seconds, the controller 302 allows the host to send a write command to write data to a closed zone. The controller 302 then switches the identified closed zone to the open and active state, and switches the least recently used open zone (e.g., the zone that has not received a write command in the longest amount of time). Thus, the maximum number of concurrent zones in the open and active state is not exceeded. The predetermined amount of time and the maximum number of zones in the open and active state listed above are not intended to be limiting, but to provide examples of possible embodiments.

Switching between an open state and a closed or resource conserved lower performance internal state for a zone requires ZNS, as discussed in FIG. 2A-2B. The maximum number of open state and active zones of the NVM 306 may equal the number of SRAM 308 temporary buffer locations. The controller 302 may swap an active and open zone to a closed zone if a write command is received that interrupts or has higher priority than the current write command associated with the open zone, or if the predetermined amount of time has expired or passed.

Generally, as discussed further below, a command to write data to a zone is received by the controller 302, the XOR engine 304 generates parity data for the command in a temporary SRAM region 310a-310n. Simultaneously, if previous parity data for the zone exists in the DRAM 312, the previous parity data is copied to a SRAM region 310a-310f (e.g., a non-temporary SRAM region where data may be stored long-term). Once the previous parity data is in a SRAM region 310a-310f, the previous parity data is updated with the new parity data stored in the temporary SRAM region 310n-4-310n. The updated parity data is then copied from the SRAM 308 to a DRAM region 314a-314n.

The data transfer speed from a DRAM region 314a-314n to a SRAM region 310a-310n may be slower than the XOR engine 304 write speed to the temporary buffer of the SRAM 308, or vice-versa. The amount of time to generate new parity data for a write command in the temporary buffer location of the SRAM 308, to copy the previous parity data from the DRAM 312 to the SRAM 308, to update the previous parity data with the new parity data in the SRAM 308, and to switch a zone from the open and active state to the closed or resource conserved lower performance internal state, as well as the amount of space in the temporary buffer, collectively determines the maximum number of open and active zones. Thus, the amount of time to generate new parity data for a write command in the temporary buffer location of the SRAM 308, to copy the previous parity data from the DRAM 312 to the SRAM 308, and/or to update the previous parity data with the new parity data in the SRAM 308 may be rate matched to the amount of time it takes to switch a zone from the open and active state to the or resource conserved lower performance internal closed state. In the embodiments herein, the temporary buffer is comprised of five SRAM regions 310n-4-310n and the maximum number of open state and active zones is five zones.

Figure 3A:
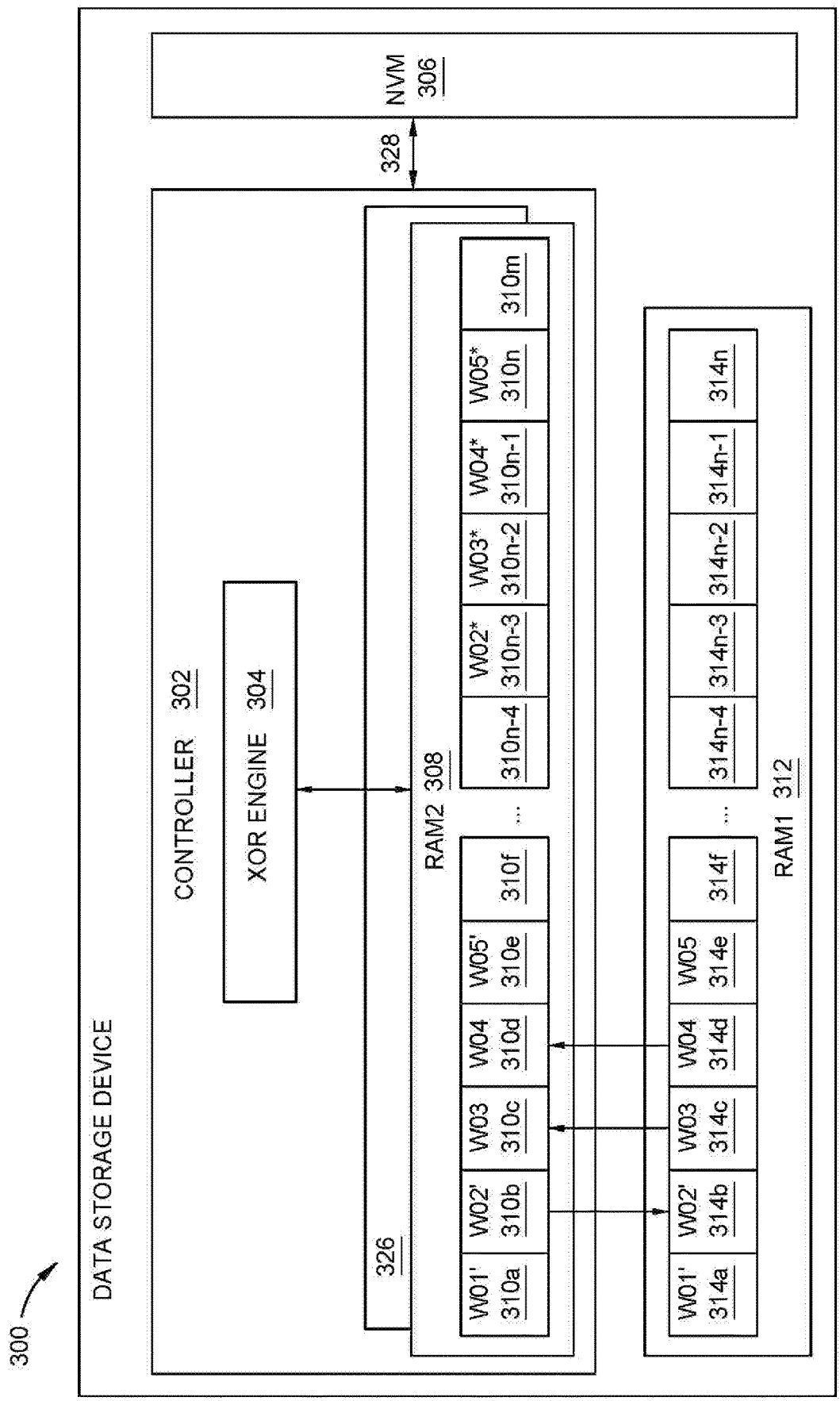
FIGS. 3A-3D illustrate a schematic block diagram of generating and/or updating data corresponding to various zones in the volatile memory, according to various embodiments.

As shown in FIG. 3A, new parity data for a second zone W02* and a fifth zone W05* was written to a second temporary SRAM region 310n-3 and a fifth temporary SRAM region 310n, respectively, upon receiving one or more commands to write data to the second and fifth zones. FIG. 3A further illustrates the updated parity or parity data for the second zone W02' being stored in both the SRAM 308 and the DRAM 312. In other words, the previous parity data for the second zone was updated with the new parity data for the second zone W02* in the SRAM 308 and copied to the DRAM 312 as updated second parity or parity data W02'. Upon updating previous parity data for a zone, the new parity data for the zone may be erased from the temporary SRAM region. Thus, updated parity or parity data for a first zone W01' is stored in a first SRAM region 310a and in the DRAM 312; however, the corresponding new parity data for the first zone has been erased from the temporary SRAM regions (e.g., a first temporary SRAM region 310n-4).

When a first write command to write data to a third zone is received by the controller 302, the XOR engine 304 writes new parity data associated with the third zone W03* for the first write command to a third temporary SRAM region 310n-2, or the first temporary buffer location available. The controller 302 simultaneously copies the previous parity data for the third zone W03 from a DRAM region 314c to an available SRAM region 310c, as shown by the arrow between 314c and 310c in FIG. 3A.

When a second write command to write data to a fourth zone is received by the controller 302, the XOR engine 304 writes new parity data associated with the fourth zone W04* for the second write command to a fourth SRAM region 310n-1, or the first temporary buffer location available. The controller 302 simultaneously copies the previous parity data for the fourth zone W04 from a DRAM region 314d to an available SRAM region 310d, as shown by the arrow between 314d and 310d in FIG. 3A. Thus, as shown in FIG. 3A, the first through fifth zones are currently in the open and active state. The host may send as many commands to write data to the first through fifth zones as the host wants however quickly and in whatever order the host wants, as the first through fifth zones are all currently in the open and active state.

Figure 3B:
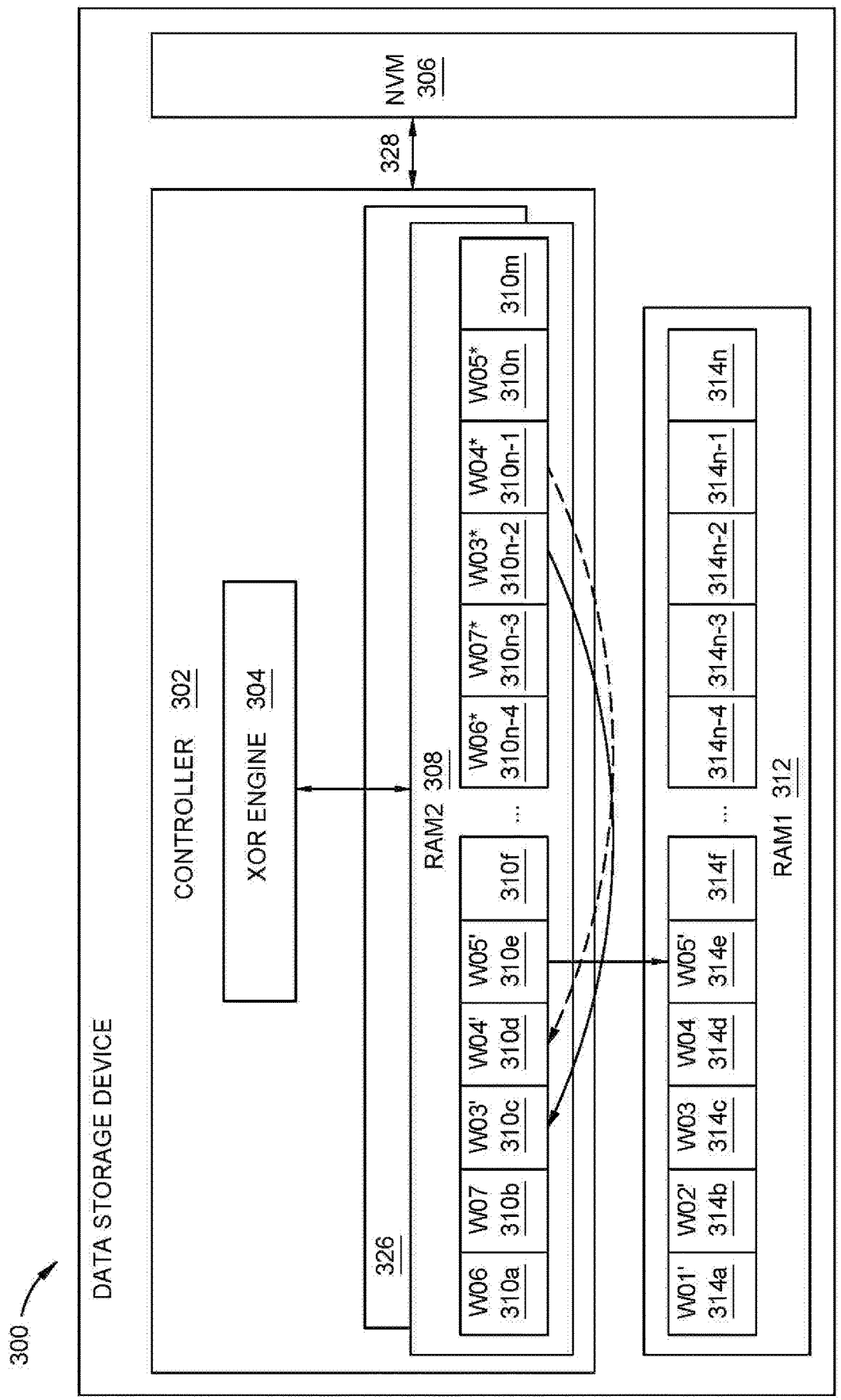

In FIG. 3B, the previous parity data associated with the third zone W03 is updated with the new parity associated with the third zone W03* to updated third parity data W03' in a third SRAM region 310c. Upon updating the previous parity data for the third zone W03' with the new parity data for the first write command, the new parity data associated with the third zone W03* for the first command may be erased from the third temporary SRAM region 310n-2. Previous parity data for a zone may be updated in any SRAM region 310a-310n.

The previous parity data associated with the fourth zone W04 is updated with the new parity associated with the fourth zone W04* to updated fourth parity data W04' in a fourth SRAM region 310d. Upon updating the previous parity data for the fourth zone W04' with the new parity data for the second write command, the new parity data associated with the fourth zone W04* for the second command may be erased from the fourth temporary SRAM region 310n-1, or the first temporary buffer location available. Simultaneously, updated parity data associated with the fifth zone W05' stored in a fifth SRAM region 310e is copied to a fifth DRAM region 314e as fifth updated parity data W05'.

A third write command to write data to a closed sixth zone is then received by the controller 302. Since the maximum number of open state and active zones is currently met (i.e., the first through fifth zones), the controller 302 closes the first zone due to the first zone being the least recently used zone, the third write command to write to a closed zone being received, and the predetermined amount of time expiring since last switching the state of a zone. Upon closing the first zone (i.e., switching the first zone to a resource conserved lower performance internal state), the parity data associated with the first zone may be erased from the SRAM 308. The XOR engine 304 generates parity data associated with the sixth zone W06* for the third command and writes the generated parity data associated with the sixth zone W06* to a first temporary SRAM region 310n-4, or the first temporary buffer location available. If previous parity data associated with the sixth is stored in the DRAM 312, the previous parity data associated with the sixth zone is then copied from the DRAM 312 to the SRAM 308.

A fourth write command to write data to a closed seventh zone is received by the controller 302 may be held in a buffer (not shown) within the controller 302 until a temporary SRAM region 310n-4-310n is available, if parity data stored in the temporary SRAM regions 310n-4-310n has not yet been erased. The controller switches the least recently used zone, which is the second zone, from the open and active state to the closed or resource conserved lower performance internal state after the predetermined amount of time of about 0.5 seconds to about 5 seconds has passed, and switches the seventh zone to the open and active state. Upon closing the second zone, the parity data associated with the second zone may be erased from the SRAM 308. New parity data associated with the seventh zone W07* for the fourth command is generated by the XOR engine 304 and is written to the second temporary SRAM region 310n-3. If previous parity data associated with the seventh zone is stored in the DRAM 312, the previous parity data associated with the seventh is then copied from the DRAM 312 to the SRAM 308.

Thus, as shown in FIG. 3B, the third through seventh zones are currently in the open and active state. The host may send as many commands to write data to the third through seventh zones as the host wants however quickly and in whatever order the host wants, as the third through seventh zones are all currently in the open and active state.

Figure 3C:
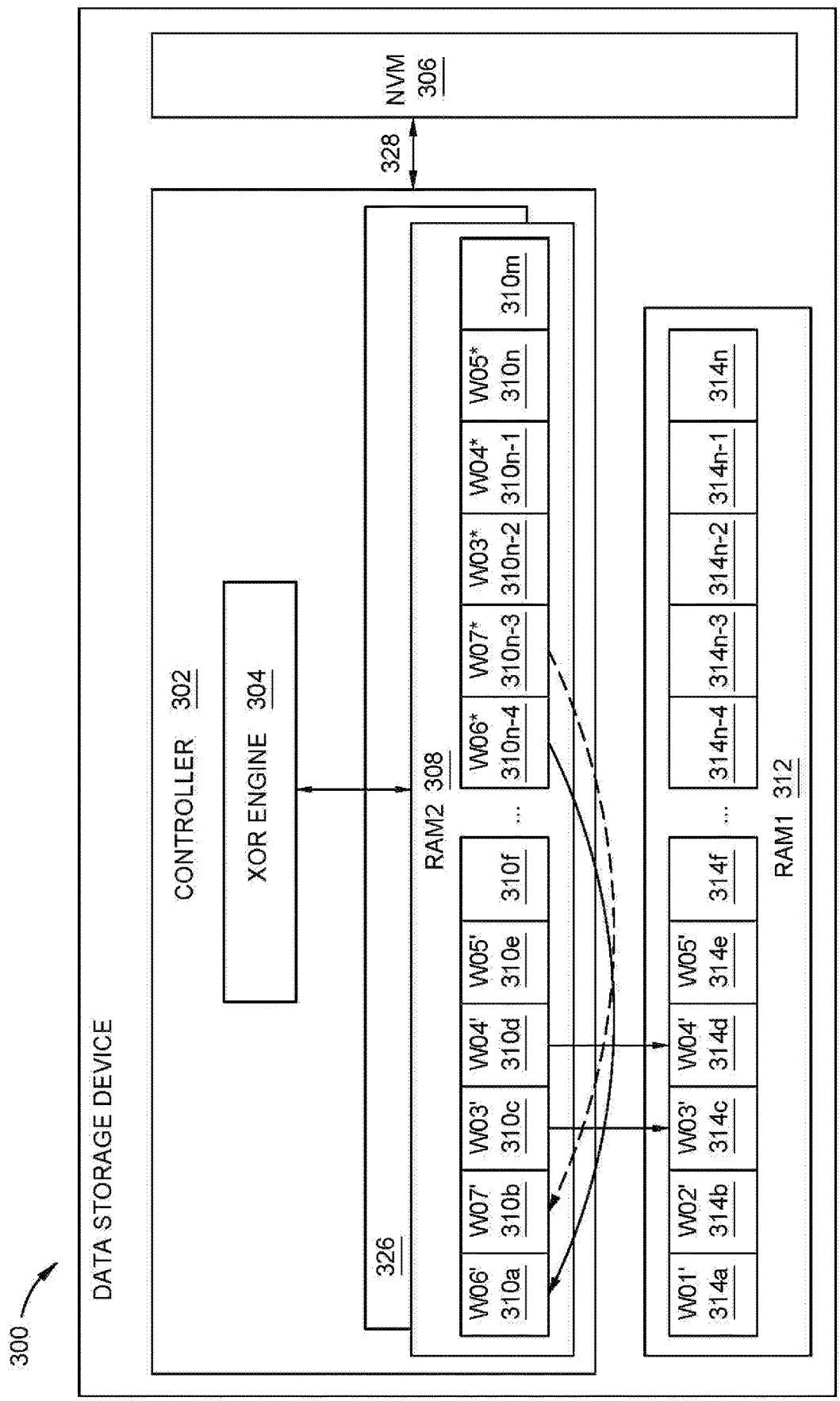

In FIG. 3C, the updated parity data associated with the third zone W03' and the updated parity data associated with the fourth zone W04' are copied from the SRAM 308 to the DRAM 312. The previous parity data associated with the sixth zone W06 is updated with the corresponding new parity data W06* as updated sixth parity data W06' in the first SRAM region 310a. Upon updating the previous parity data for the sixth zone W06' with the new parity data for the third write command, the new parity data associated with the sixth zone W06* for the third command may be erased from the first temporary SRAM region 310n-4.

The previous parity data associated with the seventh zone W07 is updated with the corresponding new parity data W07* as updated seventh parity data W07' in the second SRAM region 310b. Upon updating the previous parity data for the seventh zone W07' with the new parity data for the fourth write command, the new parity data associated with the seventh zone W07* for the fourth command may be erased from the second temporary SRAM region 310n-3. If previous parity data does not yet exist for the sixth or seventh zone or the sixth, the new parity data associated with the sixth zone W06* or the new parity data associated with the seventh zone W07* may be moved to any non-temporary SRAM region (e.g., SRAM regions 310a-310f).

Figure 3D:
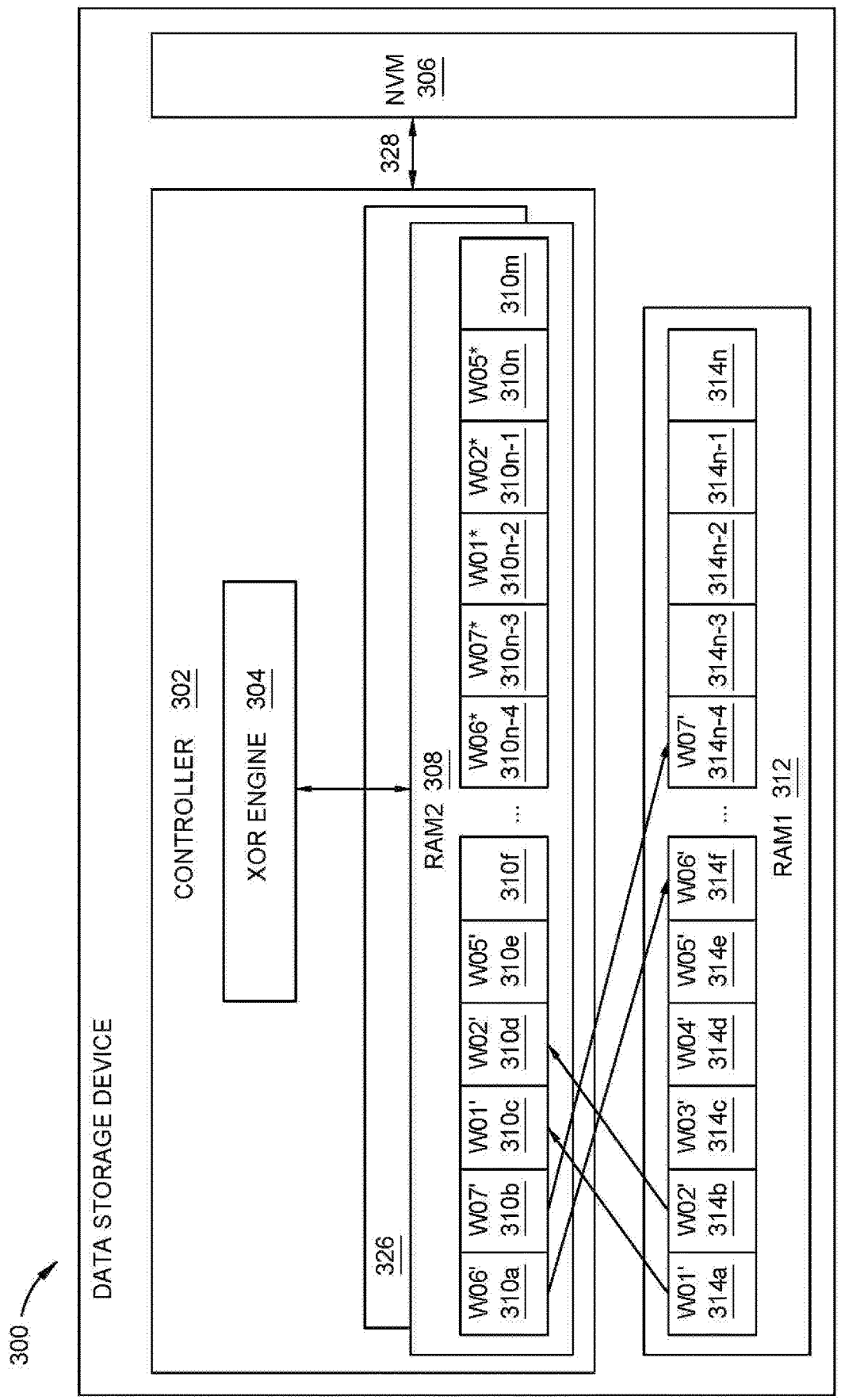

In FIG. 3D, a fifth write command to write data to the first zone is received by the controller 302. Since the first zone was previously switched to the closed or resource conserved lower performance internal state, the controller 302 switches the least recently used zone that is currently in the open and active state to the closed or resource conserved lower performance internal state, which is the third zone, upon the predetermined amount of time passing since last switching the state of a zone. The controller 302 then switches the first zone from the closed or resource conserved lower performance internal state to the open and active state. The XOR engine 304 generates new parity data associated with the first zone W01* for the fifth write command and writes the new parity data to the third SRAM region 310n-2, or the first temporary buffer location available. Simultaneously, the previous parity data associated with the first zone WO1' is copied from the DRAM 312 to the third SRAM region 310c.

A sixth write command to write data to the second zone is received by the controller 302. Since the second zone was previously switched to the closed or resource conserved lower performance internal state, the controller 302 switches the least recently used zone that is currently in the open and active state to the closed or resource conserved lower performance internal state, which is the fourth zone, upon the predetermined amount of time passing since last switching the state of a zone. The controller 302 then switches the second zone from the closed or resource conserved lower performance internal state to the open and active state.

If the predetermined amount of time has not yet expired since switching the third zone to the closed or resource conserved lower performance internal state and switching the first zone to the open and active state, the controller 302 will wait until the predetermine amount of time has passed or expired before closing the fourth zone and re-opening the second zone. The XOR engine 304 generates new parity data associated with the second zone W02* for the sixth command and writes the new parity data to the fourth temporary SRAM region 310n-1, or the first temporary buffer location available. Simultaneously, the previous parity data associated with the second zone W02' is copied from the DRAM 312 to the fourth SRAM region 310d.

Thus, when a new write command is received to write data to a previously closed zone, the controller 302 opens the zone so that the new write command can be written to the zone. However, if the maximum number of open and active zones has been reached, the controller 302 waits until the predetermined amount of time has passed before changing the least recently used zone to the closed or resource conserved lower performance internal state. After changing the least recently used zone to the closed or resource conserved lower performance internal state, the controller 302 may then change the relevant zone to the open and active state. The maximum number of open and active zones is selected to minimize any write delays, as copying data to and from the SRAM 308 to the DRAM 312 takes time.

The updated parity data associated with the sixth zone W06' is copied to an available DRAM region, such as a sixth DRAM region 314f. The updated parity data associated with the seventh zone W07' is copied to an available DRAM region, such as DRAM region 314n-4. Thus, as shown in FIG. 3D, the first, second, fifth, sixth, and seventh zones are currently in the open and active state. The host may send as many commands to write data to the first, second, fifth, sixth, and seventh zones as the host wants however quickly and in whatever order the host wants, as the first, second, fifth, sixth, and seventh zones are all currently in the open and active state.

Figure 4:
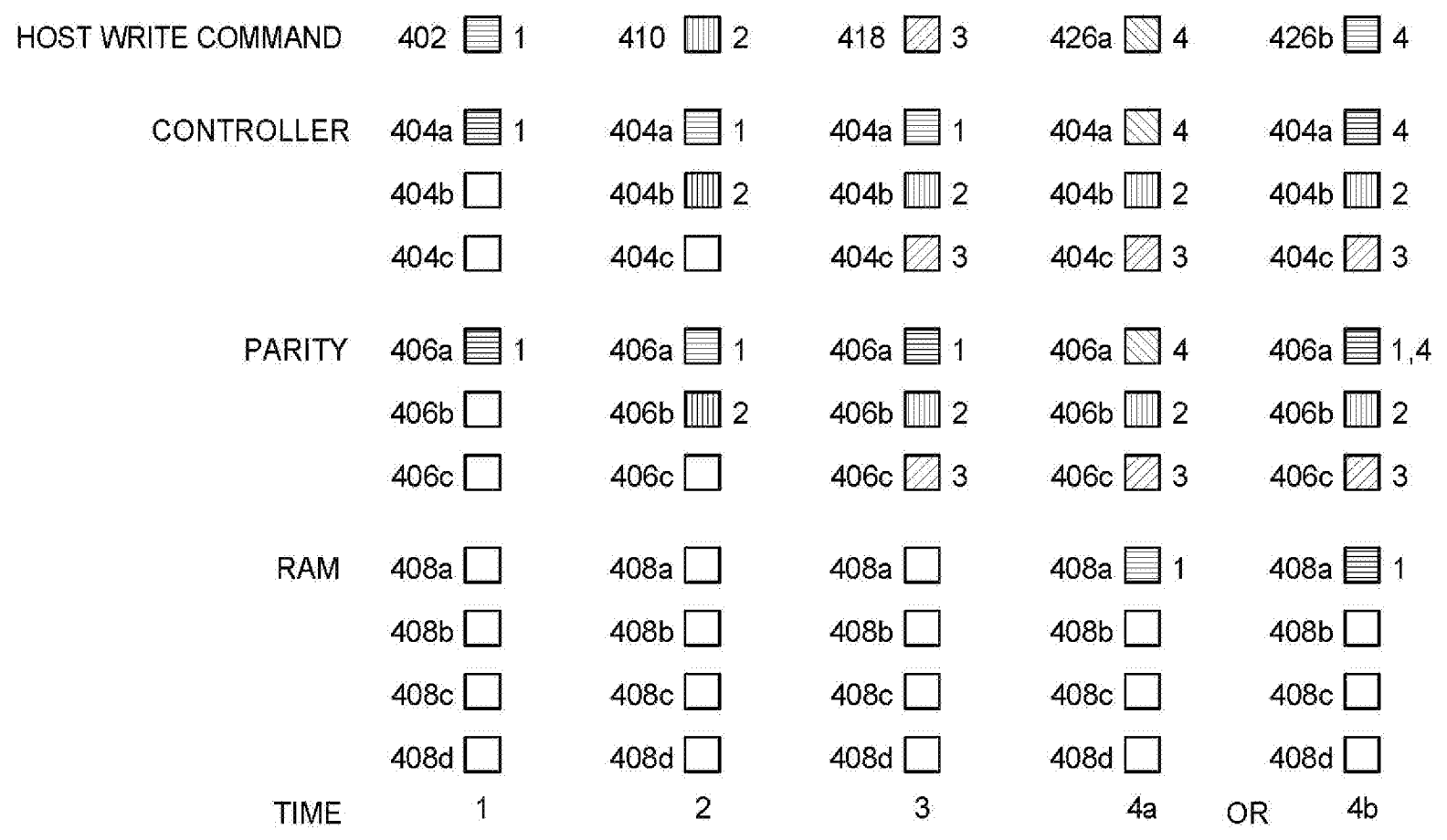

FIG. 4 illustrates a schematic diagram 400 of updating data in flight, such as parity data, over time in the storage device, according to one embodiment. The storage device of FIG. 4 may be the storage device 106 of FIG. 1. Like in the above examples, parity data will be used as an example of data in flight. The times used below are representative, and may occur in a matter of seconds or minutes. A write command to a first zone is illustrated as a horizontal striped block, a write command to a second zone is illustrated as a vertical striped block, a write command to a third zone is illustrated as a upward diagonal striped block, and a write command to a fourth zone is illustrated as a downward diagonal striped block. For example, a first write command 434 is to write data to a first zone, a second write command 442 is to write data to a second zone, and a third write command 450 is to write data to a third zone. The fourth write command 450a is to write data to a fourth zone and the fourth write command 450b is to a first zone.

In the current embodiment, the controller includes three available controller RAM or buffer regions 404a, 404b, 404c for storing host write commands and three available parity RAM or buffer regions 406a, 406b, 406c for storing parity data. The controller buffer regions 404a, 404b, 404c and the parity buffer regions 406a, 406b, 406c may be any SRAM regions of 122a-122n of FIG. 1. The controller buffer regions 404a, 404b, 404c store data not yet written to the NVM. The storage device also includes four available RAM regions 408a, 408b, 408c, 408d for parity data storage, in which each region corresponds to a zone, such that a first RAM region 408a corresponds to a first zone, a second RAM region 408b corresponds to a second zone, a third RAM region 408c corresponds to a third zone, and a fourth RAM region 408d corresponds to a fourth zone. The number of regions listed for each component above is not intended to be limiting, but to provide an example of a possible embodiment.

At time 1, the controller receives a first host write command 402 to write data to a first zone. The first host write command 402 is stored temporarily in a first controller buffer region 404a. Before or while the data of the first host write command 402 for the first zone is written to the NVM, the XOR engine 124 generates first parity data in a parity buffer region 406a for the first host write command 402 for the first zone.

At time 2, the controller receives a second host write command 410 to write data to a second zone. The second host write command 410 is stored temporarily in a second controller buffer region 404b. Before or while the data of the second host write command 410 for the second zone is written to the NVM, the XOR engine 124 generates second parity data in a parity buffer region 406b for the second host write command 410 for the second zone.

At time 3, the controller receives a third host write command 418 to write data to a third zone. The third host write command 418 is stored temporarily in a third controller buffer region 404c. Before or while the data of the third host write command 418 for the third zone is written to the NVM, the XOR engine 124 generates third parity data for the third host write command 418 for the third zone in the parity buffer region 406c.

At time 4a, the controller receives a fourth host write command 426a to write data to a fourth zone. The data of the fourth host write command 426a is written to the first controller buffer region 404a. Throughout times 1-3, a previous write command, such as the first host write command 402, stored in the first controller buffer region 404a has been successfully written to the NVM, and the data in the first controller buffer region 404a can be overwritten with the data of a new host write command data, such as the fourth host write command 426a. The first parity data for the first host write command 402 is then written to the RAM region 408a, and the XOR engine 124 generates fourth parity data for the fourth host write command 426a in the parity buffer region 406a. If a fifth host write command is received to write data to the first zone, the first parity data will be copied from the RAM region 408a back to a parity buffer region 406a-406c.

However, if the controller receives a fourth host write command to a zone that has previously been written to, such as a fourth host write command 426b to write data to the first zone, at time 4b, the data of the fourth host write command 426b is written to the first controller buffer region 404a. Throughout times 1-3, the data previously stored in the first controller buffer region 404a (e.g., the first host write command 402) has been successfully written to the NVM. However, if the data of the previous write command is still being written to the NVM, the fourth host write command 426b is temporarily held in a controller buffer (e.g., a temporary SRAM region 310n-4-310n) until the transfer to the NVM has completed. The XOR engine 124 then generates fourth parity data for the fourth host write command 426b in the parity buffer region 406a. The parity buffer region 406a thus includes both first parity data for the first host write command 402 and fourth parity data for the fourth host write command 426b.

During time 4b, since the parity buffer region 406a is still storing the first parity data for the first host write command 402 to the first zone, the controller is able to update the parity data of the first zone to include the parity data of the fourth host write command 426b without delay, unlike during time 4a. Moreover, by waiting until a next host write command is received before copying data from the parity buffers to the RAM regions, data may be copied to and from the parity buffer regions to the RAM regions fewer times. Since transferring data to and from the parity buffer regions to the RAM regions takes time, waiting to copy data from the parity buffer regions to the RAM regions allows the storage device to operate in a quicker and more efficient manner.

By setting a maximum number of open and active zones based on the amount of time it takes to copy the relevant data to and from a DRAM region to a SRAM region, write the parity data associated with a zone for the write command to a temporary buffer location in the SRAM, and update the previous parity data associated with a zone, the efficiency of the memory device may be increased. The maximum number of open and active zones is selected to minimize any write delays, as the host may send unlimited write commands to write data to open and active zones without delay. Since SRAM is fast but more expensive, and DRAM is slower but cheaper, the DRAM and SRAM usages are both better optimized, reducing any DRAM access penalties.

Therefore, by basing the maximum number of open zones on one or more of the amount of time to generate new parity data for a write command in a temporary buffer location of the SRAM, the amount of time to copy the previous parity data from the DRAM to the SRAM, the amount of time to update the previous parity data with the new parity data in the SRAM, the amount of time to switch a zone from the open and active state to the closed or resource conserved lower performance internal state, and the amount of space in the temporary buffer, the storage device can operate in the quickest, smoothest, and most efficient manner. Furthermore, by restricting the host from opening new zones only after the predetermined amount of time has passed, the storage device has enough time to copy data to and from the DRAM to the SRAM, further eliminating delays for write commands.

In one embodiment, a storage device comprises a non-volatile storage unit, wherein the capacity of the non-volatile storage unit is divided into a plurality of zones. The non-volatile storage unit comprises a plurality of dies and each of the plurality of dies comprising a plurality of erase blocks. The storage device further comprises a first volatile memory unit and a controller coupled to the non-volatile storage unit and the first volatile memory unit. The controller comprises a second volatile memory unit, wherein the controller is configured to set a maximum number of open and active zones and receive one or more first commands to write data to one or more open and active zones of the plurality of zones. The controller is further configured to receive one or more second commands to write data to a first zone, wherein the first zone is in a closed or resource conserved lower performance internal state, change a least recently used open and active zone to the closed or resource conserved lower performance internal state, and change the first zone to an open and active state.

The controller is further configured to determine which open and active zone was least recently used prior to changing the least recently used open and active zone to the closed or resource conserved lower performance internal state. The maximum number of open and active zones is determined based on an amount of time it takes to change the least recently used zone to the closed or resource conserved lower performance internal state and to change the first zone to an open and active state. The controller is further configured to change the least recently used zone to the closed or resource conserved lower performance internal state and to change the first zone to an open and active state after a predetermined amount of time has expired. The second volatile memory is a SRAM unit and the first volatile memory is a DRAM unit, and wherein the SRAM unit comprises one or more temporary locations for generating new parity data for the one or more first commands received and the one or more second commands received. The maximum number of open and active zones is determined based on a number of temporary locations in the SRAM unit. The controller is further configured to generate new first parity data for the first zone in a first temporary location in the SRAM unit, copy previous first parity data for the first open and active zone from the DRAM unit to a first location in the SRAM unit while generating the new first parity data, update the previous first parity data with the new first parity data in the SRAM unit, and copy the updated first parity data from the SRAM unit to the DRAM unit when a controller buffer area of the SRAM unit is filled to capacity, the controller buffer area temporarily storing data to be written to the non-volatile storage unit. The maximum number of open and active zones is further determined based on an amount of time the generating the new first parity data, copying the previous first parity data, and updating the previous first parity data takes.

In another embodiment, a storage device comprises a non-volatile storage unit, wherein the capacity of the non-volatile storage unit is divided into a plurality of zones. The non-volatile storage unit comprises a plurality of dies and each of the plurality of dies comprising a plurality of erase blocks. The storage device further comprises a first volatile memory unit and a controller coupled to the non-volatile storage unit and the first volatile memory unit. The controller comprises a second volatile memory unit, wherein the controller is configured to set a maximum number of open and active zones, receive one or more commands to write data to one or more open and active zones of the plurality of zones, and generate new first parity data for a first open and active zone in a temporary location of one or more temporary locations in the second volatile memory unit. The controller is further configured to copy previous first parity data for the first open and active zone from the first volatile memory unit to a first location in the second volatile memory unit. The controller is also configured to update the previous first parity data with the new first parity data in the second volatile memory unit, wherein an amount of time the generating the new first parity data, copying the previous first parity data, and updating the previous first parity data takes determines the maximum number of open and active zones.

The controller is further configured to determine the first open and active zone is a least recently used zone of the open and active zones upon receiving one or more second commands to write data to a second zone, the second zone being in a closed or resource conserved lower performance internal state, change the first open and active zone to the closed or resource conserved lower performance internal state, and change the second zone to an open and active state. The maximum number of open and active zones is determined based on an amount of time it takes to change the first zone to the closed or resource conserved lower performance internal state and to change the second zone to an open and active state. The controller is further configured to change the least recently used zone to the closed or resource conserved lower performance internal state only after a predetermined amount of time has expired. The controller comprises one or more controller buffer regions, and the one or more commands received to write data to the one or more open and active zones of the plurality of zones fill the one or more controller buffer regions to capacity. The maximum number of open and active zones is determined based on a number of temporary locations in the second volatile memory unit. The second volatile memory is a SRAM unit and the first volatile memory is a DRAM unit.

In another embodiment, a storage device comprises a non-volatile storage unit, wherein the capacity of the non-volatile storage unit is divided into a plurality of zones. The non-volatile storage unit comprises a plurality of dies and each of the plurality of dies comprising a plurality of erase blocks. The storage device further comprises a first volatile memory unit and a controller coupled to the non-volatile storage unit and the first volatile memory unit. The controller comprises a second volatile memory unit, wherein the second volatile memory comprises one or more temporary locations. The controller is configured to set a maximum number of open and active zones, wherein the maximum number of open and active zones is determined based on a number of temporary locations in the second volatile memory and receive one or more first commands to write data to one or more open and active zones of the plurality of zones. The controller is further configured to generate new first parity data for a first open and active zone in a first temporary location in the second volatile memory unit, change a second open and active zone to a closed or resource conserved lower performance internal state upon receiving one or more second commands to write data to a closed zone, and change the closed zone to an open and active state.

The controller is further configured to copy previous first parity data for the first open and active zone from the first volatile memory unit to a first location in the second volatile memory unit while generating the new first parity data. The controller is also configured to update the previous first parity data with the new first parity data in the second volatile memory unit. The maximum number of open and active zones is further determined based on an amount of time the generating the new first parity data, copying the previous first parity data, and updating the previous first parity data takes, and an amount of time it takes to change the second open and active zone to the closed or resource conserved lower performance internal state and to change the closed zone to an open and active state. The controller is further configured to determine that the second open and active zone is the open and active zone that was least recently used. The controller is further configured to change an open and active zone to the closed or resource conserved lower performance internal state after a predetermined amount of time has expired, wherein the predetermined amount of time is about 0.5 seconds to about 5 seconds, and wherein the maximum number of open and active zones is further determined based on the predetermined amount of time.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
   a non-volatile storage unit, wherein a capacity of the non-volatile storage unit is divided into a plurality of zones, and wherein the non-volatile storage unit comprises a plurality of dies, each of the plurality of dies comprising a plurality of erase blocks;
   a first volatile memory unit; and
   a controller coupled to the non-volatile storage unit and the first volatile memory unit, the controller comprising a second volatile memory unit, wherein the controller is configured to:
      set a maximum number of open and active zones;
      receive one or more first commands to write data to one or more open and active zones of the plurality of zones;
      receive one or more second commands to write data to a first zone, wherein the first zone is in a closed or resource conserved lower performance internal state;
      change a least recently used open and active zone to the closed or resource conserved lower performance internal state; and
      change the first zone to an open and active state.

2. The storage device of claim 1, wherein the controller is further configured to determine which open and active zone was least recently used prior to changing the least recently used open and active zone to the closed or resource conserved lower performance internal state.

3. The storage device of claim 1, wherein the maximum number of open and active zones is determined based on an amount of time it takes to change the least recently used zone to the closed or resource conserved lower performance internal state and to change the first zone to an open and active state.

4. The storage device of claim 1, wherein the controller is further configured to change the least recently used zone to the closed or resource conserved lower performance internal state and to change the first zone to an open and active state after a predetermined amount of time has expired.

5. The storage device of claim 1, wherein the second volatile memory is a SRAM unit and the first volatile memory is a DRAM unit, and wherein the SRAM unit comprises one or more temporary locations for generating new parity data for the one or more first commands received and the one or more second commands received.

6. The storage device of claim 5, wherein the maximum number of open and active zones is determined based on a number of temporary locations in the SRAM unit.

7. The storage device of claim 6, wherein the controller is further configured to:
   generate new first parity data for the first zone in a first temporary location in the SRAM unit;
   copy previous first parity data for the first open and active zone from the DRAM unit to a first location in the SRAM unit while generating the new first parity data;
   update the previous first parity data with the new first parity data in the SRAM unit; and
   copy the updated first parity data from the SRAM unit to the DRAM unit when a controller buffer area of the SRAM unit is filled to capacity, the controller buffer area temporarily storing data to be written to the non-volatile storage unit.

8. The storage device of claim 7, wherein the maximum number of open and active zones is further determined based on an amount of time the generating the new first parity data, copying the previous first parity data, and updating the previous first parity data takes.

9. A storage device, comprising:
   a non-volatile storage unit, wherein a capacity of the non-volatile storage unit is divided into a plurality of zones, and wherein the non-volatile storage unit comprises a plurality of dies, each of the plurality of dies comprising a plurality of erase blocks;
   a first volatile memory unit; and
   a controller coupled to the non-volatile storage unit and the first volatile memory unit, the controller comprising a second volatile memory unit, wherein the controller is configured to:
      set a maximum number of open and active zones;
      receive one or more commands to write data to one or more open and active zones of the plurality of zones;
      generate new first parity data for a first open and active zone in a temporary location of one or more temporary locations in the second volatile memory unit;
      copy previous first parity data for the first open and active zone from the first volatile memory unit to a first location in the second volatile memory unit; and
      update the previous first parity data with the new first parity data in the second volatile memory unit, wherein an amount of time the generating the new first parity data, copying the previous first parity data, and updating the previous first parity data takes determines the maximum number of open and active zones.

10. The storage device of claim 9, wherein the controller is further configured to:
    determine the first open and active zone is a least recently used zone of the open and active zones upon receiving one or more second commands to write data to a second zone, the second zone being in a closed or resource conserved lower performance internal state;
    change the first open and active zone to the closed or resource conserved lower performance internal state; and
    change the second zone to an open and active state.

11. The storage device of claim 10, wherein the maximum number of open and active zones is determined based on an amount of time it takes to change the first zone to the closed or resource conserved lower performance internal state and to change the second zone to an open and active state.

12. The storage device of claim 10, wherein the controller is further configured to change the least recently used zone to the closed or resource conserved lower performance internal state only after a predetermined amount of time has expired.

13. The storage device of claim 10, wherein the controller comprises one or more controller buffer regions, and wherein the one or more commands received to write data to the one or more open and active zones of the plurality of zones fill the one or more controller buffer regions to capacity.

14. The storage device of claim 9, wherein the maximum number of open and active zones is determined based on a number of temporary locations in the second volatile memory unit.

15. The storage device of claim 9, wherein the second volatile memory is a SRAM unit and the first volatile memory is a DRAM unit.

16. A storage device, comprising:
a non-volatile storage unit, wherein a capacity of the non-volatile storage unit is divided into a plurality of zones, and wherein the non-volatile storage unit comprises a plurality of dies, each of the plurality of dies comprising a plurality of erase blocks;
a first volatile memory unit; and
a controller coupled to the non-volatile storage unit and the first volatile memory unit, the controller comprising a second volatile memory unit, the second volatile memory comprising one or more temporary locations, wherein the controller is configured to:
set a maximum number of open and active zones, wherein the maximum number of open and active zones is determined based on a number of temporary locations in the second volatile memory;
receive one or more first commands to write data to one or more open and active zones of the plurality of zones;
generate new first parity data for a first open and active zone in a first temporary location in the second volatile memory unit;
change a second open and active zone to a closed or resource conserved lower performance internal state upon receiving one or more second commands to write data to a closed zone; and
change the closed zone to an open and active state.

17. The storage device of claim 16, wherein the controller is further configured to:
copy previous first parity data for the first open and active zone from the first volatile memory unit to a first location in the second volatile memory unit while generating the new first parity data; and
update the previous first parity data with the new first parity data in the second volatile memory unit.

18. The storage device of claim 17, wherein the maximum number of open and active zones is further determined based on an amount of time the generating the new first parity data, copying the previous first parity data, and updating the previous first parity data takes, and an amount of time it takes to change the second open and active zone to the closed or resource conserved lower performance internal state and to change the closed zone to an open and active state.

19. The storage device of claim 16, wherein the controller is further configured to determine that the second open and active zone is the open and active zone that was least recently used.

20. The storage device of claim 16, wherein the controller is further configured to change an open and active zone to the closed or resource conserved lower performance internal state after a predetermined amount of time has expired, wherein the predetermined amount of time is about 0.5 seconds to about 5 seconds, and wherein the maximum number of open and active zones is further determined based on the predetermined amount of time.

* * * * *